(No Model.) 2 Sheets—Sheet 1.
C. L. TRAVIS.
BICYCLE OR LIKE VEHICLE.
No. 578,614. Patented Mar. 9, 1897.
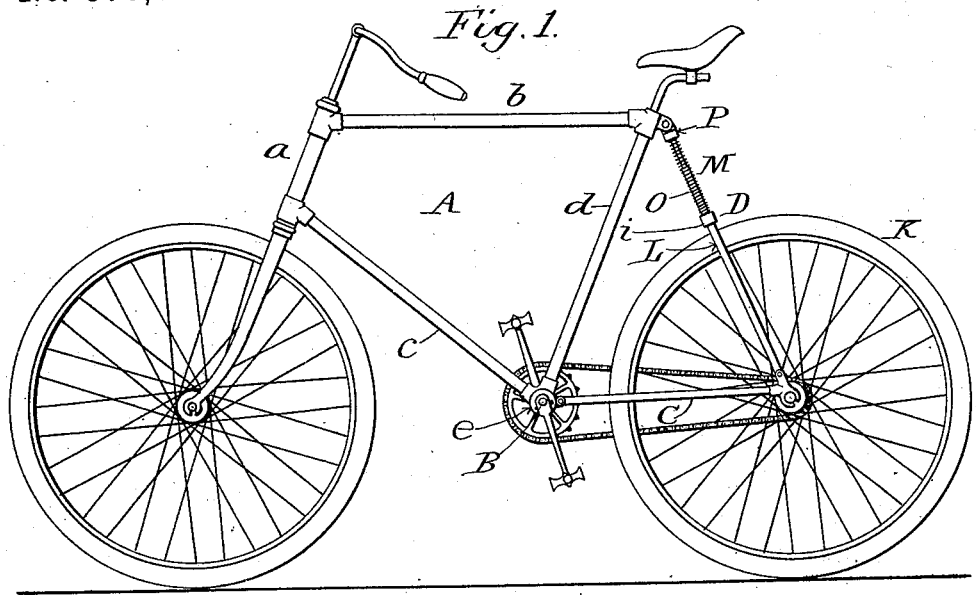
Fig. 1.
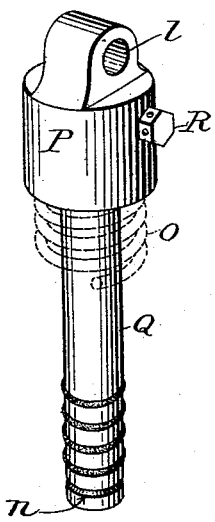
Fig. 3.
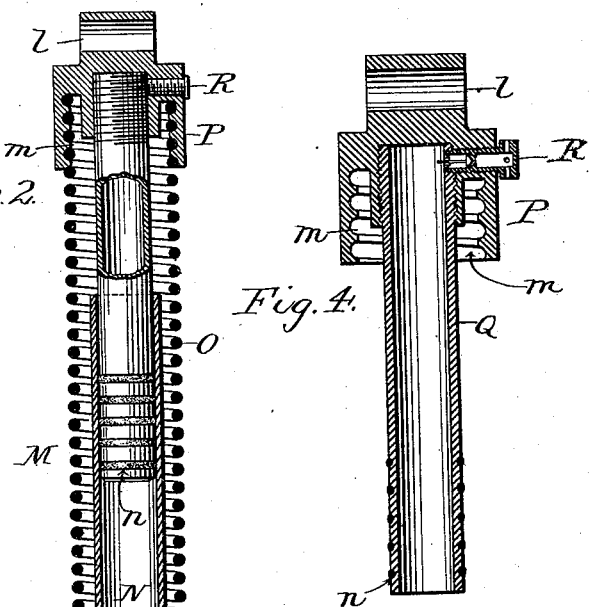
Fig. 2.
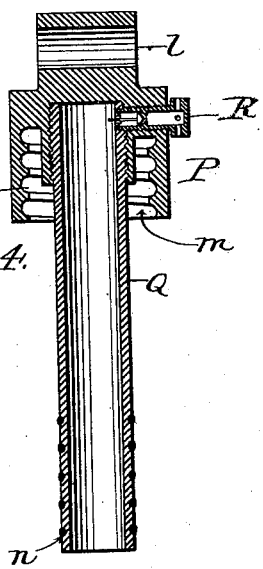
Fig. 4.
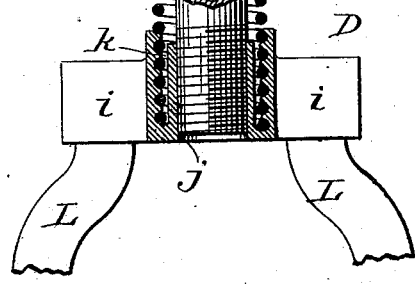
Witnesses
C. C. Burdine
C. B. Bull
Inventor:
Charles L. Travis,
by Dodge Son,
Attorneys.
THE NORRIS PETERS CO., PHOTO-LITHO., WASHINGTON, D. C.

(No Model.) 2 Sheets—Sheet 2.

C. L. TRAVIS.
BICYCLE OR LIKE VEHICLE.

No. 578,614. Patented Mar. 9, 1897.

Witnesses
C. C. Burdine.
E. B. Bull.

Inventor:
Charles L. Travis,
by Dodge Sons,
Attorneys.

UNITED STATES PATENT OFFICE.

CHARLES L. TRAVIS, OF MINNEAPOLIS, MINNESOTA, ASSIGNOR TO THE HYGIENIC WHEEL COMPANY, OF PHILADELPHIA, PENNSYLVANIA.

BICYCLE OR LIKE VEHICLE.

SPECIFICATION forming part of Letters Patent No. 578,614, dated March 9, 1897.

Application filed December 17, 1895. Serial No. 572,433. (No model.) Patented in Belgium March 17, 1896, No. 120,374, and in Italy March 31, 1896, XXXI, 41,078, LXXX, 378.

*To all whom it may concern:*

Be it known that I, CHARLES L. TRAVIS, a citizen of the United States, residing at Minneapolis, in the county of Hennepin and State of Minnesota, have invented certain new and useful Improvements in Bicycles or Like Vehicles, (for which I have received Letters Patent of Italy, No. XXXI, 41,078, LXXX, 378, dated March 31, 1896, and of Belgium, No. 120,374, dated March 17, 1896,) of which the following is a specification.

My invention relates to bicycles and like vehicles, and particularly to such as are jointed and provided with a yielding member to take up the jar and concussion occasioned by obstacles and irregularities in the roadway or surface over which the vehicle travels.

Figure 5:
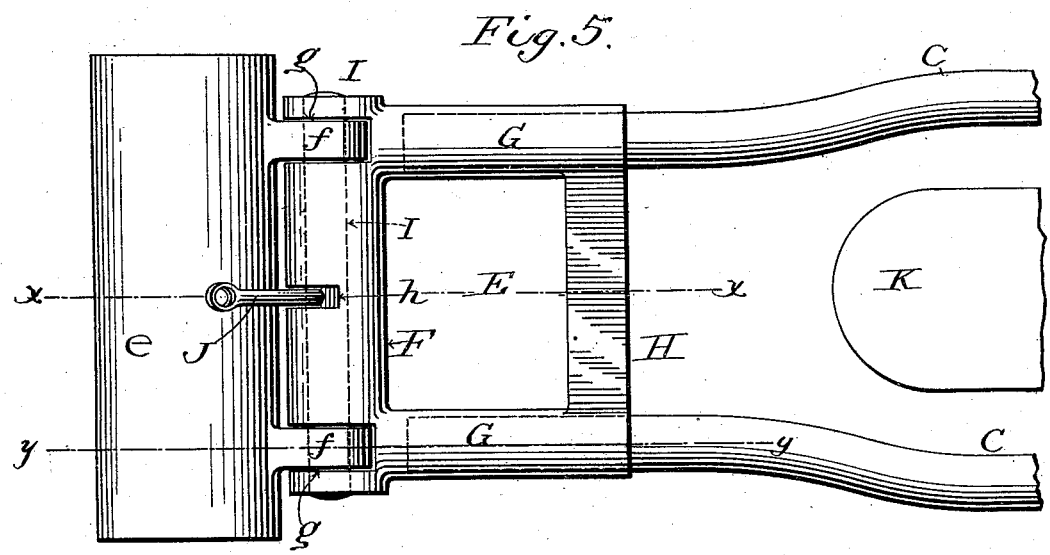

In the accompanying drawings, Figure 1 is a side elevation of a bicycle, showing my invention applied thereto; Fig. 2, a sectional view showing the construction of the yielding member; Figs. 3 and 4, views showing details of construction of said member; Fig. 5, a bottom plan view illustrating the method of joining the rear-wheel fork to the front frame; and Figs. 6 and 7 sectional views on the lines $x\,x$ and $y\,y$, respectively, of Fig. 5.

In Fig. 1 of the annexed drawings there is shown a bicycle embodying the usual diamond frame. A indicates the front rigid portion of said frame, comprising the head $a$, upper bar $b$, lower bar $c$, and saddle-post standard $d$, at the lower end of which is located the barrel or shell $e$, carrying the pedal-shaft B.

The rear portion of the frame comprises the rear-wheel fork C and the yielding member D. The rear fork is flexibly connected to the front frame in rear of the barrel $e$, and the yielding member D is flexibly connected at its lower end to the rear end of the fork C and at its upper end to the saddle-post standard at or near its top.

The connection of the rear fork C to the front frame will be made as close as practicable to the barrel $e$ in order that there shall be no appreciable variation in distance between the axis of the pedal-shaft and that of the rear wheel. From actual use I find the mode of connection shown in Figs. 5, 6, and 7 to answer admirably. Referring to said figures, it will be seen that the pedal-shaft barrel $e$ is provided with two rearwardly-extending ears or lugs $f\,f$, having transverse openings therethrough. The inner ends of the tubes or rods forming the rear fork C are secured to a web or frame E. This web or frame consists of a rounded head or cross-bar F, two rearwardly-extending arms G G, and a web or brace H. The head F is provided with slots or recesses $g\,g$, adapted to receive the lugs $f\,f$, and also with a round opening extending throughout its length and registering with the openings in the lugs or ears. A pin I is passed through these openings and secures the web or frame to the barrel $c$. It is of course desirable that the frame E should turn on the pin I, in that the pin I has a greater bearing or more extended wearing-surface therein than it has on the lugs or ears $f\,f$. To this end means are employed for holding the pin stationary with relation to said lugs and allowing the head F to turn on the pin.

Figure 6:
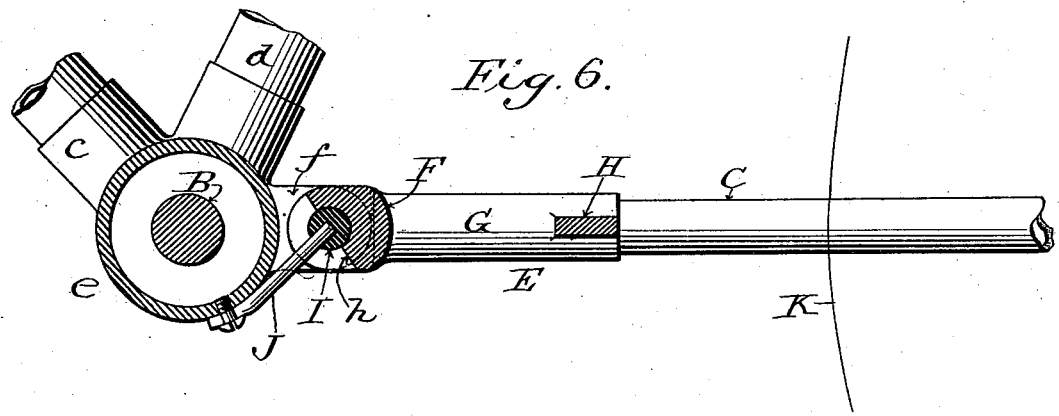
Figure 7:
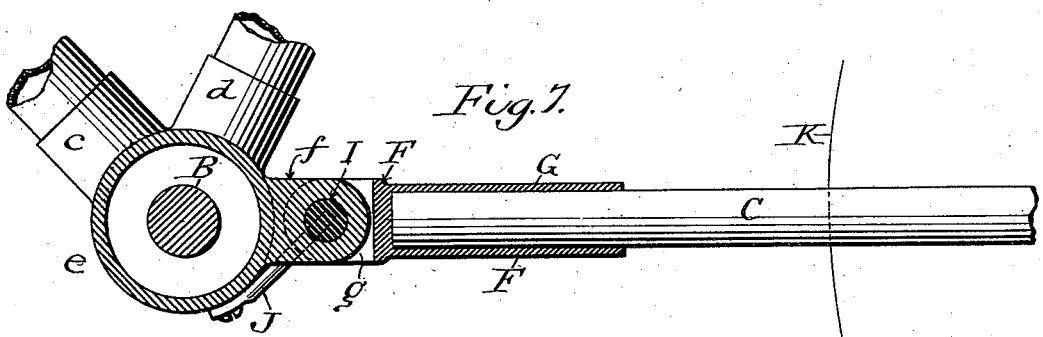

The under portion of the center of the head is cut away to form a slot $h$, exposing the pin I, as will be clearly seen upon reference to Figs. 5 and 6. At this point a hole will be drilled into said pins to admit the end of a key or stud J, the other end of which is securely fastened to the barrel $e$. This key or stud will effectually prevent the pin I from turning in the ears or lugs $f\,f$, and consequently the frame E will have to turn on said pin. The pin I is also secured against endwise movement by the key or stud J, and thus all threading and nuts are dispensed with. The frame or web E will be drop-forged, the transverse opening through the head drilled out, and the slots $g\,g$ and $h$ cut away or milled out. The rearwardly-extending arms G G will be drilled out, and the ends of the rear fork securely brazed therein. The web or brace H securely holds the arms G in their proper position and materially adds to the stiffness of the structure.

K indicates the rear wheel, the axle of which is carried in the rear end of fork C, as usual. Said wheel will be provided with a sprocket-wheel and driven by a chain from a sprocket-wheel on the pedal-shaft or in any other suitable manner.

The yielding member D comprises the fork or brace L, pivoted to the rear fork C at its end, the compressible portion M, and means for connecting said latter portion to the saddle-post standard.

Broadly stated, the yielding portion comprises two telescopic members, an air-cushion, and a compressible spring, all adapted to act in conjunction with each other and take up the jar and concussion communicated to them through the frame.

The head or cross-bar $i$ of the fork L is formed with an internally-threaded opening $j$ and an annular channel or groove $k$, said channel being provided with a female screw-thread.

N denotes a tube threaded at its lower end and mounted in the opening $j$. The lower end of the tube will be securely and tightly closed, the purpose of which will be presently explained.

A coiled spring O is screwed into the annular channel or groove $j$, as will be clearly seen upon reference to Fig. 2. A socket or cap-piece P is flexibly connected to the upper end of the saddle-post standard, said socket-piece being provided with a transverse opening $l$ to receive a bolt by which it is connected to said standard. The interior of the socket-piece is formed with a central screw-threaded recess and an annular channel or groove $m$, said channel being provided with a female screw-thread and adapted to receive and securely hold the upper end of spring O.

Into the central recess of the socket or cap-piece there is secured a tube Q of such diameter that its end fits closely into the tube N, which it enters. The lower end of this tube is formed with a series of depressions $n$, into which any suitable packing may be placed.

Ordinarily if the joint between the tubes or telescopic members be made close enough no packing need be employed, a small amount of oil between said members being found to give excellent results in retaining the air in the chamber formed by said parts when they were brought together and the spring put under compression.

R indicates a check-valve designed to communicate with the chamber formed by the telescopic tubes, said valve seating outwardly, as will be seen upon reference to Fig. 4. I have shown the valve as mounted in the cap-piece or socket P, though of course it may be located at any convenient point. The tube P will of course be of such length that under no circumstances can the grooved portion thereof come above the upper end of the tube N. The parts of the yielding member being assembled, the spring is put under a slight torsional strain, which tends to more securely hold the ends of the spring in place and at the same time prevent any rattling of the parts.

Under the construction herein set forth any lateral or side play of the rear frame will be prevented by the telescopic members. Since the leverage is but slight at the upper end of the yielding member the telescopic members may be made small and light.

A long and elastic spring is employed and the diameter of the same may be varied at pleasure to render its action stiff or easy to suit the tastes of the individual riders. In no instance, however, should the coils come into contact with the telescopic members, as such contact would cut or wear away the spring and also cause the same to cramp.

In passing over an unevenness or obstruction in the roadway the spring will be compressed, and the tubular sections being brought together the air confined in the chamber formed thereby will also be compressed and the action of the spring checked as it nears the end of its movement. A small amount of air will escape between the ends of the tubes, but the check-valve seating outwardly will prevent any escape of air in that direction, and an air-cushion is thus formed in the telescopic tubes. After the wheel has passed over the obstruction the spring tends to elongate and return the parts to their normal position, and as the check-valve seats outwardly air will have free access to the tubular members therethrough as the members are drawn apart and the size of the air-chamber increased. There will therefore be no drag upon the quick return of the parts to their normal position by the spring.

Having thus described my invention, what I claim is—

1. In a bicycle or like vehicle, the combination with the rigid front frame; of the jointed rear frame flexibly connected thereto; said rear frame having a yielding member embodying two tubular sections adapted to telescope; and a coiled spring encircling said sections.

2. In a bicycle or like vehicle, the combination with the rigid front frame; of the jointed rear frame flexibly connected thereto, said rear frame comprising the rear-wheel fork, and a yielding brace flexibly connected to the rear end of the latter, and to the upper end of the front frame, the yielding portion of the brace comprising two tubular telescopic sections encircled by a coiled spring.

3. A spring member for bicycle-frames, comprising a fork adapted to embrace a wheel, a tubular casing secured to the head of the fork, a spring also secured to the head of the fork and encircling the tubular casing, a socket or cap-piece secured upon the upper end of the spring; and a tubular casing secured to the socket or cap-piece and adapted to telescope with the casing carried by the head of the fork.

4. In combination with the rigid front frame, the jointed rear frame flexibly connected therewith, the spring member of which comprises a fork or brace connected to the rear end of the rear-wheel fork; a tubular shell extending upwardly from the head of the fork; a coiled spring having its lower end secured to said head and encircling the tubular shell; a socket or cap-piece secured to the upper end of the spring and provided with a tubular shell adapted to telescope with the tubular shell carried by the head of the fork; and means for flexibly connecting said socket to the upper end of the saddle-post standard.

5. In a bicycle or like vehicle, the combination with the rigid front frame; of the jointed rear frame flexibly connected thereto; said rear frame having a yielding member embodying two tubular sections adapted to telescope, and fitting air-tight one within the other; and a spring coacting with and tending to elongate said yielding member.

6. A spring member for bicycle-frames embodying two telescopic sections forming an inclosed air-chamber; a check-valve communicating with said chamber; and a coiled spring encircling said telescopic sections and tending normally to keep said sections in an extended position.

7. In a bicycle, the combination of the rigid front frame; the rear jointed frame flexibly connected therewith; said rear frame comprising the rear-wheel fork connected to the front frame at or near the pedal-shaft hanger; a brace or fork flexibly jointed to the rear-wheel fork at or near its end; a tube mounted upon the head of brace; a spiral spring also mounted on said head and encircling the tube; a cap-piece or socket secured upon the upper end of the spring, and flexibly secured to the upper end of the saddle-post standard; a tube extending from the cap-piece and telescoping with the lower tube; and an outwardly-seating air-check communicating with the air-space formed by the telescoping tubes.

8. In combination with the pedal-shaft hanger having perforated lugs formed thereon, the web or frame E, comprising a tubular head having slots formed therein to receive the lugs; a pin passing through the tubular head and openings in the lugs; a slot in the head; a hole in the pin in line with said slot; and a key rigidly secured to the barrel and passing into the hole in the pin, whereby said pin is prevented from turning or moving endwise.

In witness whereof I hereunto set my hand in the presence of two witnesses.

CHARLES L. TRAVIS.

Witnesses:
H. S. SHELTON,
D. A. FANCHELD.